(12) United States Patent
Steigerwald et al.

(10) Patent No.: US 8,019,768 B1
(45) Date of Patent: Sep. 13, 2011

(54) BIDIRECTIONAL DATA STRUCTURE PROCESSING

(75) Inventors: Charles D. Steigerwald, Apple Valley, MN (US); Donald G. Smith, New Brighton, MN (US)

(73) Assignee: Unisys Corporation, Blue Bell, PA (US)

(*) Notice: Subject to any disclaimer, the term of this patent is extended or adjusted under 35 U.S.C. 154(b) by 1752 days.

(21) Appl. No.: 10/735,550

(22) Filed: Dec. 12, 2003

(51) Int. Cl.
*G06F 17/30* (2006.01)

(52) U.S. Cl. ......................................... 707/755; 707/756

(58) Field of Classification Search .................. 707/100, 707/206, 10, 755, 756
See application file for complete search history.

(56) References Cited

U.S. PATENT DOCUMENTS

| | | | | |
|---|---|---|---|---|
| 5,396,622 A * | 3/1995 | Lee et al. | | 707/7 |
| 5,664,172 A * | 9/1997 | Antoshenkov | | 707/4 |
| 5,845,274 A * | 12/1998 | Chadha et al. | | 707/2 |
| 5,893,120 A * | 4/1999 | Nemes | | 707/206 |
| 6,012,061 A * | 1/2000 | Sharma | | 707/100 |
| 6,247,014 B1 * | 6/2001 | Ladwig et al. | | 707/100 |
| 6,347,318 B1 * | 2/2002 | Rokicki | | 707/100 |
| 6,427,147 B1 * | 7/2002 | Marquis | | 707/4 |
| 6,496,830 B1 * | 12/2002 | Jenkins, Jr. | | 707/100 |
| 6,965,894 B2 * | 11/2005 | Leung et al. | | 707/10 |
| 2002/0122485 A1 * | 9/2002 | Gough | | 375/240.08 |
| 2003/0182272 A1 * | 9/2003 | Leung et al. | | 707/3 |

* cited by examiner

*Primary Examiner* — Mahesh Dwivedi
(74) *Attorney, Agent, or Firm* — Richard J. Gregson

(57) ABSTRACT

To enhance data structure processing performance, data is organized bi-directionally in a data structure. That is, depending on the value of a data key associated with an entry, the entry is stored either from a low end or from a high end of the data structure. For example, the low end of the data structure may store entries having even-valued keys, while the high end of the data structure may store entries having odd-valued keys. Subsequent data structure processing can be facilitated by searching the data structure in either a forward direction starting with the low end or a reverse direction starting with the high end, depending on whether a search key is even or odd.

21 Claims, 5 Drawing Sheets

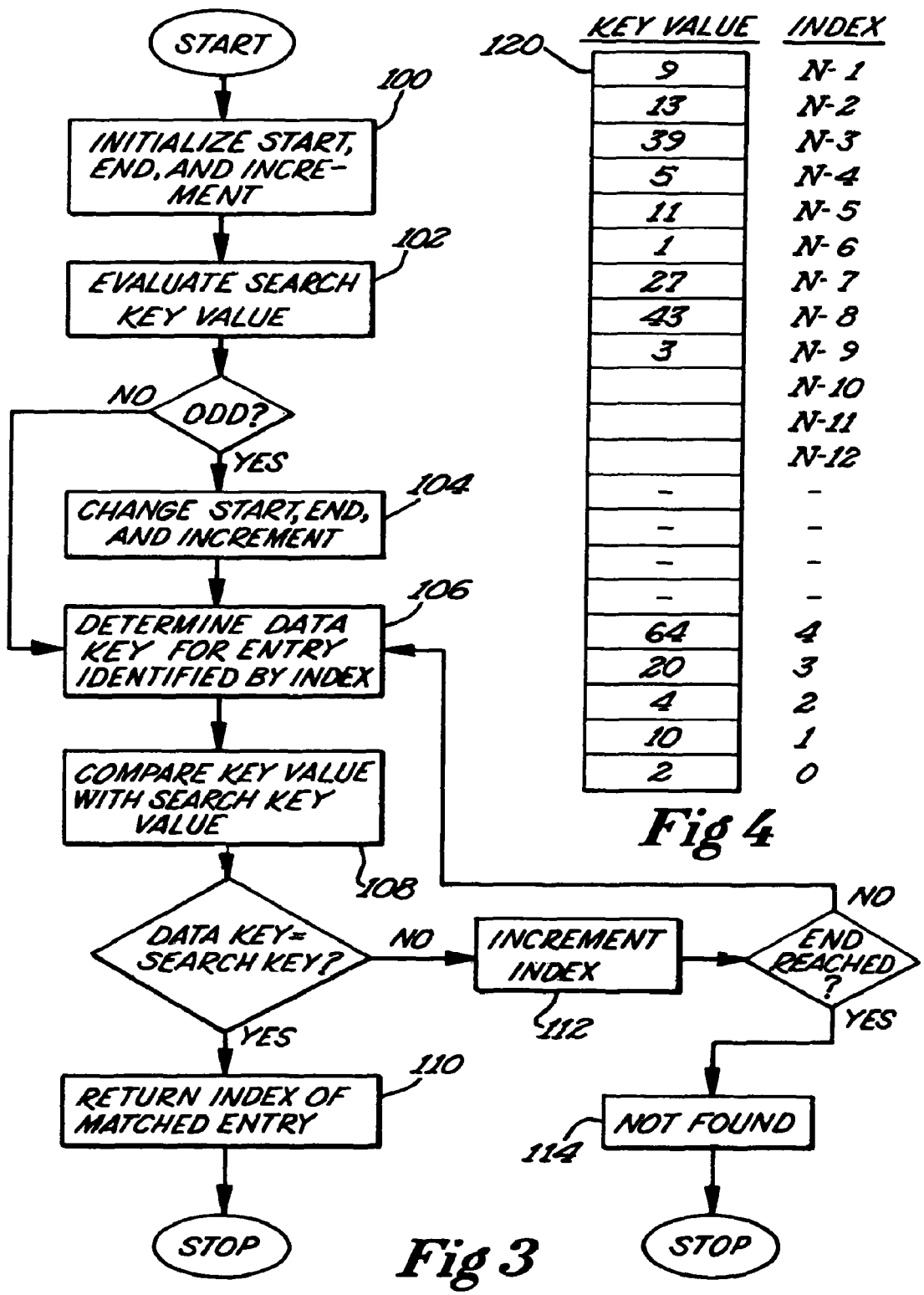

BIDIRECTIONAL DATA STRUCTURE PROCESSING

TECHNICAL FIELD

The disclosure relates generally to data processing. More particularly, this disclosure relates to storage and retrieval of data in a data structure.

BACKGROUND

Computers have long used data structures to store data used by computer programs. Data structures contain data entries, or records, each of which can be identified using a value known as a data key. A data key is an identifier of an entry in the data structure and may be one of the fields of the data structure. Alternatively, the data key can be derived by applying some fixed function, such as a hash function, to one or more of the fields.

As a particular example, in a database storing employee information, an employee number may serve as a data key. Other information about the employee can be stored in the data structure fields associated with that particular key. Such other information would be accessible via the data key, for example, by calling a function with the data key as an argument. The number of fields that are available for each key is dependent on how the data structure is defined.

Data structures can be accessed for a number of reasons, including, for example, storing data in the data structure and retrieving data from the data structure. In either case, the data structure is typically accessed using a sequential processing method. For example, in searching for an entry having a data key matching a search key, a computer typically begins by comparing the search key with the data key corresponding to the first entry in the data structure. If the keys do not match, the computer repeats the comparison with successive entries in the data structure until an entry is found whose corresponding key matches the search key or until the computer reaches the last entry in the data structure. If the computer reaches the last entry in the data structure without finding an entry whose key matches the search key, the computer may notify the user that no entry was located.

A sequential processing method will locate an entry having a corresponding key that matches the search key, if such an entry exists in the data structure. In many cases, however, the data structure is non-ordered with respect to the data key of interest, such that the entries are not consecutive. For example, the data structure may be ordered with respect to one field, but non-ordered with respect to one or more other fields. As a result, to search for a particular entry, the computer compares the search key to the essentially random key values for consecutive entries until the computer finds an exact match. This process can be time-consuming, particularly for data structures having many entries.

SUMMARY OF THE INVENTION

To enhance data structure processing performance, data is organized in a data structure as a function of the value of data keys associated with the data. In particular, certain bits are used to characterize the data, and this characterization is used in selecting an initial search location, a search direction, or both. In some embodiments, for example, a data entry is stored either from a low end or from a high end of the data structure, depending on whether a data key associated with the data entry is even-valued or odd-valued as determined from the least significant bit (LSB) of the data key. For example, the low end of the data structure may store entries having even-valued keys, while the high end of the data structure may store entries having odd-valued keys. Subsequent data structure processing can be facilitated by searching the data structure from either a forward direction or a reverse direction, depending on whether a search key is even or odd.

One embodiment is directed to a method to access an entry in a data structure comprising a plurality of entries each associated with a respective index. A preliminary index is selected as a function of a search key. The search key is compared with a data key associated with a preliminary entry associated with the preliminary index. When the search key and the data key associated with the preliminary entry do not match, the preliminary index is adjusted as a function of the search key.

Another embodiment is directed to a computer system in which a data structure is stored. The data structure includes entries that are associated with respective data keys and indices. The computer system includes one or more subsystems, such as one or more processors and memory devices, for selecting a start index, an end index, and a search direction as a function of a search key, for comparing the search key with a data key associated with an entry associated with the start index, and for adjusting the start index as a function of the search key when the search key and the data key associated with the entry associated with the start index do not match.

In another embodiment, a search key is stored in a data structure comprising a plurality of entries by selecting a preliminary entry of the data structure and a search direction as a function of the search key. The search key is compared with a data key associated with the preliminary entry. When the search key and the data key associated with the selected entry do not match, the search key with at least one respective data key associated with at least one of a plurality of entries occurring in the selected search direction until an entry associated with a key matching the search key is located. An unpopulated entry of the data structure is identified. When no entry associated with a data key matching the search key is located, the search key is stored in the unpopulated entry.

Another embodiment involves removing a data key from a data structure comprising a plurality of entries by selecting a preliminary entry of the data structure and a search direction as a function of the search key. The search key is compared with a data key associated with the selected entry. When the search key and the data key associated with the selected entry do not match, the search key is compared with at least one respective key associated with at least one of a plurality of entries occurring in the selected search direction until an entry associated with a data key matching the search key is located. When a data key matching the search key is located in the data structure, the located key is replaced with a value of zero.

In another embodiment, a computer arrangement includes a memory configured to store a data structure comprising a plurality of entries. Each entry is associated with a respective index. A system bus is operatively coupled to the memory to access the data structure. A processor is operatively coupled to the system bus to access the data structure. The processor is configured to select a start index, an end index, and a search direction as a function of a search key. The search key is compared with a data key associated with an entry associated with the start index. The processor adjusts the start index as a function of the search key when the search key and the data key associated with the entry associated with the start index do not match.

BRIEF DESCRIPTION OF THE DRAWINGS

The present invention will now be described, by way of example, with reference to the accompanying drawings, in which:

FIG. 3 is a flow diagram illustrating an example process according to another embodiment.

FIG. 4 is a diagram illustrating an example bi-directionally organized data structure that can be searched for a search key using the process of FIG. 3.

DESCRIPTION OF VARIOUS EMBODIMENTS

Figure 1:
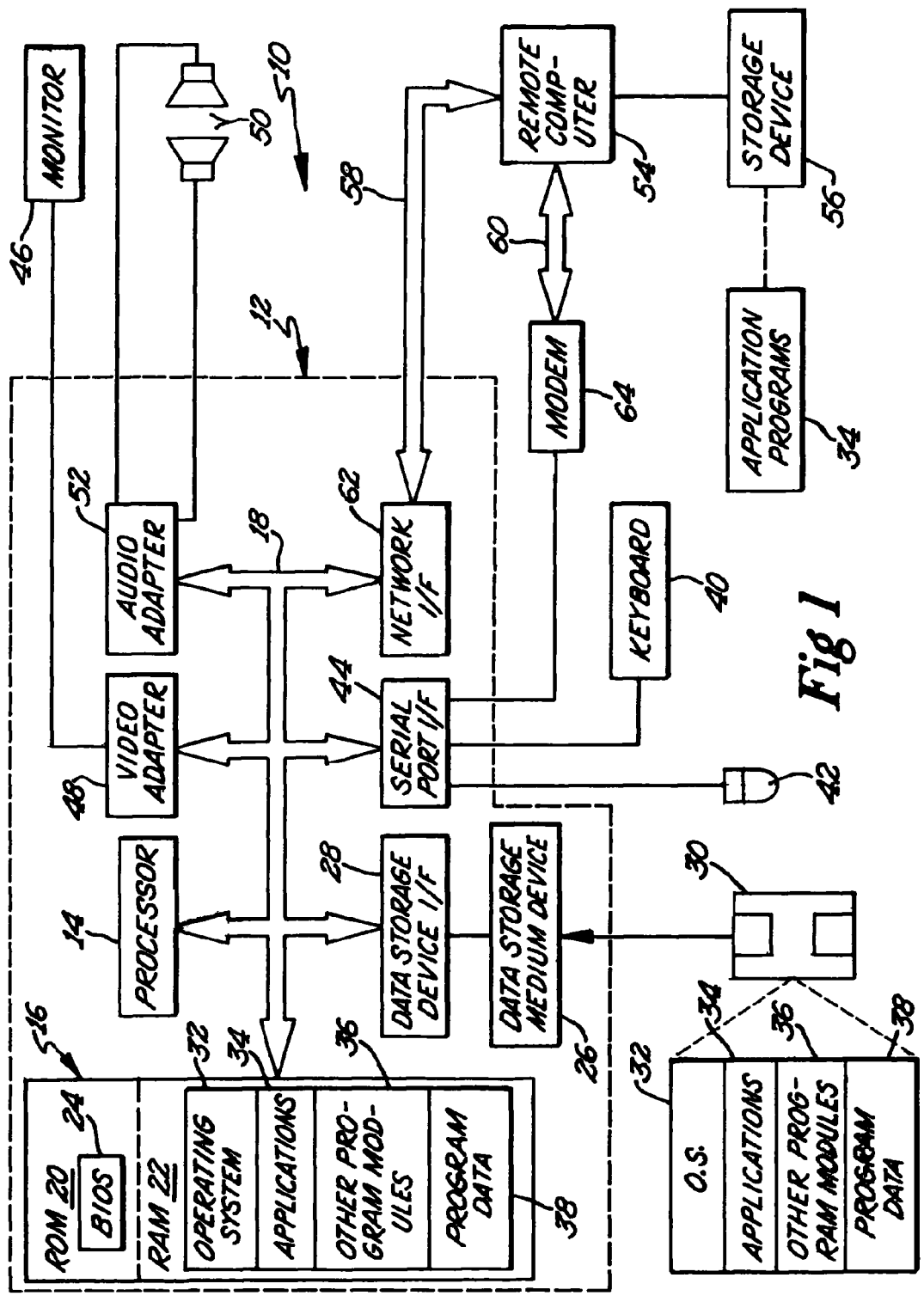
FIG. 1 is a system diagram illustrating an example operating environment.

According to various embodiments, a search key is located in, stored in, or removed from a data structure, such as an array, by searching the data structure starting from a location selected as a function of the value of the search key and, optionally, proceeding in a direction selected as a function of the value of the search key. In some embodiments, for example, data is stored at both ends of a data structure. Data is stored either from the low end or from the high end of the data structure, depending on the value of an associated data key. The low end of the data structure stores data having even-valued keys. The high end of the data structure stores data having odd-valued keys. The data key can be, for example, a numeric value or a character string.

The data structure is accessed to locate, store, or remove a search key by first characterizing the search key, for example, as "even" or "odd." Regardless of whether the search key is a numeric value or a character string or other non-numeric type of key, the search key can be represented as a series of bits, each of which has a value of either zero or one. The search key can be considered "even" if the least significant bit (LSB) has a value of zero. If the LSB has a value of one, the search key can be considered "odd."

It will be appreciated by those skilled in the art that a bit other than the LSB can be used to characterize the search key. In some embodiments, two or more bits may be used to characterize the search key. For example, the two least significant bits may be used to characterize the search key as ending in 00, 01, 10, or 11. In such an embodiment, an additional level of organization may be added to the storage and searching scheme of the data structure. Within the low end of the data structure, for example, data having data keys ending in 00 may be stored at even indices, and data having data keys ending in 10 may be stored at odd indices. Similarly, within the high end of the data structure, data having data keys ending in 01 may be stored at even indices, and data having data keys ending in 11 may be stored at odd indices.

After determining whether the search key is even-valued or odd-valued, the data structure is searched beginning at the low end if the search key is even-valued and at the high end if the search key is odd-valued. If the entry at the selected end of the data structure does not have a data key that matches the search key, the search proceeds in a direction also determined by whether the search key is even-valued or odd-valued.

If multiple bits are used to characterize the search key, search performance may be further improved, for example, by searching the data structure in an interleaved manner. For example, if the two least significant bits of a search key are 10, the data structure may be searched starting at the lowest odd index and proceeding to alternate indices in ascending order.

Although certain embodiments are described in this disclosure as storing and searching data as a function of whether a data key is even or odd as determined by the LSB, different schemes may be employed to select an initial search location and a search direction. For example, although certain embodiments are described as storing data from an end and in a direction selected as a function of the data key, other embodiments may involve storing data in an interleaved manner, with odd data keys corresponding to odd indexes and even data keys corresponding to even indexes. As another alternative, the data structure can be conceptually divided into two partitions. In such an embodiment, the partition in which data is stored and searched can be selected as a function of the data key. Those skilled in the art will appreciate that other embodiments consistent with the spirit and scope of the disclosed embodiments may be practiced.

Referring now to the drawings, FIG. 1 illustrates an operating environment in conjunction with which various embodiments may be practiced. The description of FIG. 1 is intended to provide a general description of suitable computer hardware and a suitable computing environment with which various embodiments may be implemented. Although not required, some embodiments are described in the general context of computer-executable instructions, such as program modules, being executed by a computer, such as a personal computer (PC). Generally, program modules include, but are not limited to, routines, programs, objects, components, and data structures that perform particular tasks or implement particular abstract data types.

The embodiments described herein and other embodiments may be practiced with other computer system configurations, including, but not limited to, hand-held devices, multiprocessor systems, microprocessor-based or programmable consumer electronics, network personal computers (NPCs), minicomputers, mainframe computers, and the like. Various embodiments may also be practiced in distributed computing environments in which remote processing devices linked through a communications network perform tasks in a cooperative manner to achieve some result. In a distributed computing environment, program modules may be located in both local and remote memory storage devices.

FIG. 1 depicts a computer arrangement implemented as a general-purpose computer system 10. The computer system 10 includes a general purpose computing device, such as personal computer (PC) 12, which includes at least one processor 14, a system memory 16, and a system bus 18 that operatively couples the system memory 16 and other system components to the processor 14. While the PC 12 is depicted in FIG. 1 as incorporating a single processor 14, in some embodiments, the PC 12 may incorporate a plurality of processors 14 arranged in a parallel processing environment. Further, the computer system 10 may incorporate a single PC 12 or a plurality of computers, including one or more PCs 12, arranged in a distributed computing environment.

The system bus 18 may be implemented as any of several types, including a memory bus or memory controller, a peripheral bus, and a local bus, and may use any of a variety of bus architectures. The system memory 16 may also be referred to as the memory and includes read-only memory (ROM) 20 and random-access memory (RAM) 22. A basic input/output system (BIOS) 24 stored in the ROM 20 contains basic routines that transfer information between components of the PC 12. The BIOS 24 also contains start-up routines for the system.

The PC 12 may include other components coupled to the system bus 18, such as one or more data storage medium devices 26 coupled to the system bus 18 via one or more data storage device interfaces 28. The data storage medium device 26 may be implemented, for example, as a hard disk drive, a removable magnetic disk drive, or an optical disk drive. The data storage medium device 26 either includes or is configured to receive a data storage medium 30 on which data is stored and retrieved. The data storage medium 30 may be either removable or fixed, and may be read-only or rewritable. Non-limiting examples of data storage media include hard disks, floppy disks, CD-ROMs, and DVD-ROMs. The data storage medium device 26 and data storage medium 30 provide nonvolatile storage of computer-readable instructions, data structures, program modules and other data for the PC 12. Those skilled in the art will appreciate that other types of computer-readable media that can store data accessible by a computer may also be used in the computer system 10. Such media may include, for example, magnetic tape cassettes, flash memory cards, RAMs, ROMs, and the like.

In various embodiments, program modules are stored on the data storage medium 30, ROM 20, and/or RAM 22 and may be moved among these devices, for example, from the data storage medium 30 to the RAM 22. Program modules may include an operating system (OS) 32, one or more application programs 34, other program modules 36, and/or program data 38. A user may enter commands and information into the PC 12 through an input device, such as a keyboard 40 or a pointing device 42. Other input devices (not shown) for various embodiments may include, for example, a microphone, a joystick, a game pad, a satellite dish, a scanner, or the like. These and other input devices may be coupled to the processor 14 through a serial port interface 44 coupled to the system bus 18 or through other interfaces not shown in FIG. 1, such as a parallel port, a game port, or a universal serial bus (USB) interface. A monitor 46 or other display device may also be coupled to the system bus 18 via an interface such as a video adapter 48. In some embodiments, one or more speakers 50 or other audio output transducers are driven by an audio adapter 52 connected to the system bus 18. In some embodiments, in addition to the monitor 46, the computer system 10 includes other peripheral output devices (not shown), such as a printer or the like.

In some embodiments, the PC 12 operates in a networked environment using logical connections to one or more remote computers 54. The remote computer 54 may be another PC, a server, a router, a network PC, a peer device, or other common network node. The remote computer 54 may include many or all of the components described above in connection with the PC 12, including a storage device 56. The logical connections depicted in FIG. 1 include a local area network (LAN) connection 58 and a wide area network (WAN) connection 60. While FIG. 1 illustrates both a LAN connection 58 and a WAN connection 60 connecting the PC 12 to the remote computer 54, typical embodiments would only include one or the other rather than both. Such networking environments are commonplace in offices, enterprise-wide computer networks, intranets and the Internet.

When placed in a LAN networking environment, the PC 12 connects to the LAN through a network interface or adapter 62. When used in a WAN networking environment such as the Internet, the PC 12 typically includes a modem 64 or other means for establishing communications over the WAN. The modem 64 may be internal or external to the PC 12 and connects to the system bus 18 via the serial port interface 44 in the embodiment shown. In a networked environment, program modules depicted as residing within PC 20 or portions thereof may be stored in a remote storage device. For example, in FIG. 1, application programs 34 are depicted as being stored at least in part on the storage device 56. It is to be understood that the network connections shown are merely illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members, or variables, and member functions, or methods, that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation. That is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

In some embodiments, the computer system 10 stores a data structure in the system memory 16, for example, in the RAM 22. Data is stored in the data structure as entries having one or more fields. Each entry can be identified using a data key that may correspond to one of the fields of the data structure. Alternatively, the data key can be derived by applying some fixed function, such as a hash function, to one or more of the fields. The data key can be, for example, a numeric value or a character string.

The data structure can be considered to have first and second "ends," for example, a "low" end and a "high" end. The low end is the end containing the first entry of the data structure. The high end is the end that would contain the last entry of the data structure if the data structure were fully populated starting at the low end. To improve data structure processing performance, the computer system 10 organizes the data bi-directionally in a partially populated data structure to make use of both ends of the data structure. That is, data is stored either from the low end or from the high end of the data structure, depending on the value of the data key. The low end of the data structure stores data having even-valued keys. The high end of the data structure stores data having odd-valued keys. As an alternative, the computer system 10 may store data in a single direction starting at either the low end of the data structure or at some subsequent entry, e.g., the middle entry of the data structure, depending on the value of the data key. As another alternative, the computer system 10 may store data in alternate entries in a single direction starting at either the first entry or the second entry of the data structure. In such an implementation, data having even-valued keys would be interleaved with data having odd-valued keys.

As described above, the data key can be a numeric value or a character string. In any case, the data key has a binary representation. If the binary representation of the data key has a least significant bit (LSB) of 0, the data key is considered even-valued and is stored at the low end of the data structure. On the other hand, if the binary representation of the data key has an LSB of 1, the data key is considered odd-valued and is stored at the high end of the data structure.

The data structure is accessed to locate and read, store, or remove a search key by first determining whether the search key is even-valued or odd-valued. After determining whether the search key is even-valued or odd-valued, the data structure is searched beginning at the low end if the search key is even-valued and at the high end if the search key is odd-valued. If the entry at the selected end of the data structure does not have a data key that matches the search key, the search proceeds in a direction also determined by whether the search key is even-valued or odd-valued. More particularly, if the search key is even-valued, the search begins at the low end of the data structure and proceeds in a forward direction toward the high end of the data structure. Conversely, if the search key is odd-valued, the search begins at the high end of the data structure and proceeds in a reverse direction toward the low end of the data structure.

Figure 2:
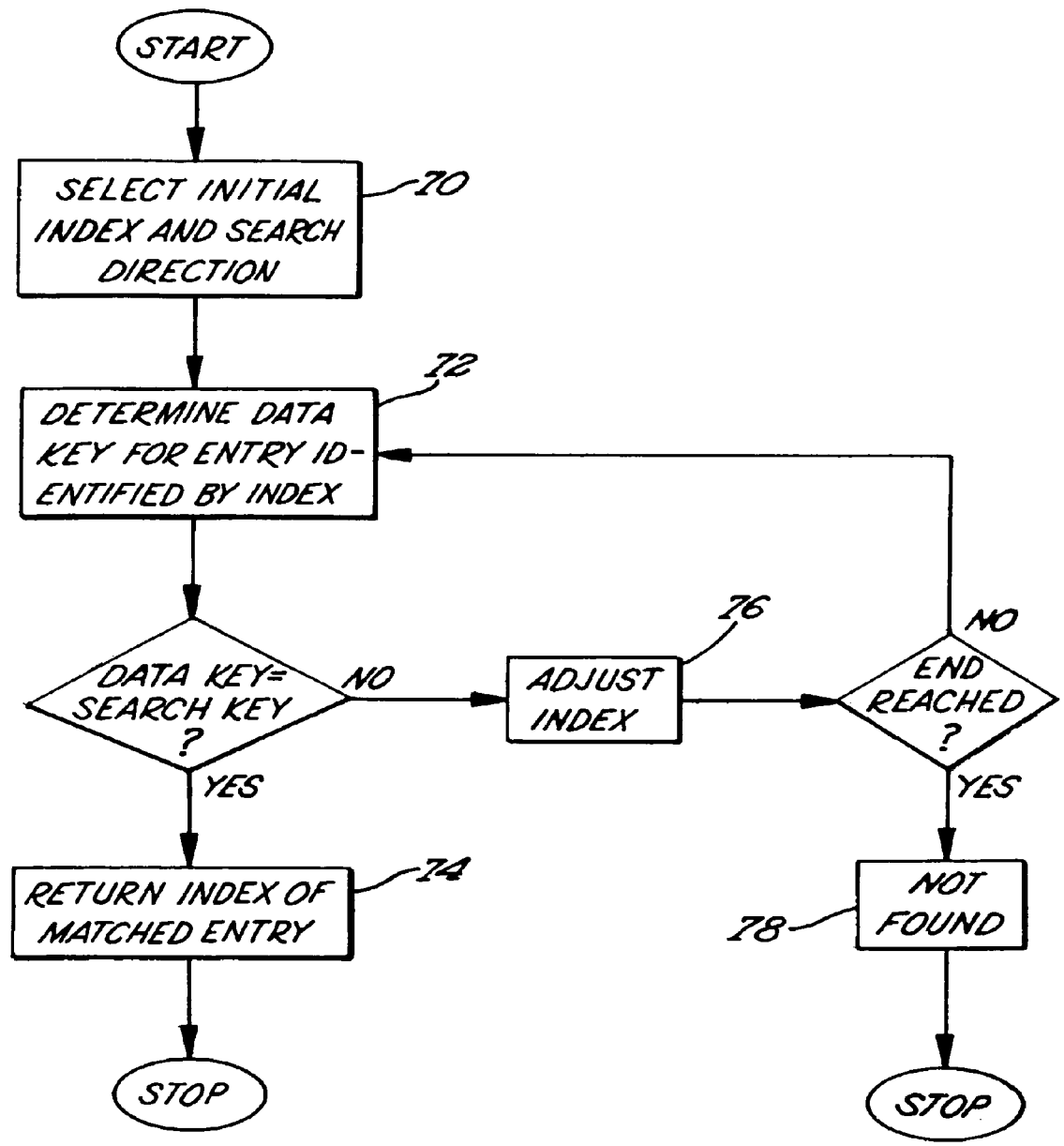
FIG. 2 is a flow diagram illustrating an example process according to one embodiment.

FIG. 2 is a flow diagram illustrating an example method to search a data structure for a data key. The data structure contains a number of entries, each of which is uniquely identified by an index. For example, according to one conventional notation, the first entry in the data structure, i.e., the "lowest" entry, is identified by an index of 0. In this notation, the last or "highest" entry in the data structure is identified by an index of N−1, where N is the size of the data structure. Thus, for instance, in a data structure storing 500 entries, the entries are identified by indices ranging from 0 to 499. Based on the value of a search key, the computer system 10 selects an initial index and search direction (70) as a starting point for the search process. For example, if the LSB of the search key is 0, the initial index may be 0, and the computer system 10 may select an ascending or forward search direction. If, on the other hand, the LSB is 1, the initial index may be N−1, and the computer system 10 may select a descending or reverse search direction.

After the computer system 10 selects the initial search index and search direction, the computer system 10 determines a data key for the entry identified by the initial search index (72). If this data key is equal to the search key, the index of the matched entry is returned (74). If the data key is not equal to the search key, the computer system 10 adjusts the index (76). The adjusted index is then evaluated to determine whether the search has reached the end of the data structure. If the search has not yet reached the end of the data structure, the computer system 10 compares the data key corresponding to the adjusted index with the search key. If the data key and the search key are equal, the computer system 10 returns the index identifying the matched entry (74). This process of adjusting the index (76) and comparing the key value corresponding to the adjusted index with the search key is repeated until a match is found. If the search reaches the end of the data structure without finding an entry having a data key that matches the search key, a result is returned indicating that no match was found (78). For example, the value −1 may be used to indicate that no match was found.

FIG. 3 is a flow diagram illustrating an example method to search a data structure for a search key. The data structure contains a number of entries, each of which is uniquely identified by an index. For example, according to one conventional notation, the first entry in the data structure, i.e., the "lowest" entry, is identified by an index of 0. In this notation, the last or "highest" entry in the data structure is identified by an index of N−1, where N is the size of the data structure. Thus, for instance, in a data structure storing 500 entries, the entries are identified by indices ranging from 0 to 499.

The search method employs a preliminary or start index Start, an end index End, and an increment value Increment. In the example method shown in FIG. 3, the values of Start, End, and Increment are initialized (100) as if the search key is even. Accordingly, Start has an initial value of 0, End has an initial value of N, and Increment has an initial value of 1.

Next, the search key is evaluated (102) to determine whether it is even or odd. The search key may be evaluated using any of a variety of conventional techniques, such as performing a logical AND operation with the search key and a value of 1 as operands. If the search key is even, the result of the logical AND operation will be 0. On the other hand, if the search key is odd, the result of the logical AND operation will be 1. If the search key is odd, the values of Start, End, and Increment are changed (104) so that the search starts at the last entry in the data structure and proceeds toward the first entry. Accordingly, Start is changed to N−1 and End is changed to 0. To select the a reverse or descending search direction, Increment is changed to −1.

While the method illustrated in FIG. 3 is shown as initializing the values of Start, End, and Increment as if the search key is even and modifying those values if the search key is odd, those of skill in the art will appreciate that alternative implementations may be practiced. For example, the values of Start, End, and Increment may be initialized as if the search key is odd and modified if the search key is even. In this implementation, Start has an initial value of N, End has an initial value of 0, and Increment has an initial value of −1. If the search key is even, Start, End, and Increment are assigned values of 0, N, and 1, respectively. As another alternative, the values of Start, End, and Increment may be initialized only after evaluating the search key to determine whether the search key is odd or even.

Regardless of the particular approach used to determine the values of Start, End, and Increment, the values control the starting point and search direction of the search. The computer system 10 determines a data key for the data structure entry identified by the index Start (106) and compares this key value with the search key (108). If the data key and the search key are equal, the computer system 10 returns the index identifying the matched entry (110). In some embodiments, entries that do not store data have a data key of 0 and are ignored.

If the data keys are not equal, the index is incremented by Increment (112). Incrementing the index by Increment has the effect of advancing the search to the next entry in the data structure if Increment has a value of 1. If Increment has a value of −1, incrementing the index by Increment has the effect of advancing the search to the previous entry in the data structure. In this way, the value of Increment controls the search direction of the search. After the index is incremented, the value of the index is compared with End to determine whether the search has reached the end of the data structure. If the search has not yet reached the end of the data structure, the computer system 10 determines the data key for the data structure entry identified by the incremented index (106) and compares this key value with the search key (108). If the data key and the search key are equal, the computer system 10 returns the index identifying the matched entry (110). This process of incrementing the index (112), determining the data key for the data structure entry identified by the incremented index (106), and comparing this key value with the search key (108) is repeated until a match is found. If the search reaches the end of the data structure without finding an entry having a data key that matches the search key, a result is returned indicating that no match was found (114). For example, the value −1 may be used to indicate that no match was found.

FIG. 4 illustrates an example bi-directionally organized data structure 120 that can be searched for a search key using the method shown in FIG. 3. For purposes of simplifying the discussion, FIG. 4 only depicts the index values and key values for selected entries. The individual fields forming an entry are not shown. The data structure 120 contains N entries identified by indices ranging from 0 to N−1. As shown in FIG. 4, entries having even key values are stored starting at the low end of the data structure, i.e., starting from the entry corresponding to an index value of 0. Entries having odd key values are stored starting at the high end of the data structure, i.e., starting from the entry corresponding to an index value of N−1. The data structure 120 may be only partially populated, that is, some entries in the data structure 120 may not store any data and may not have an associated key value.

To search the data structure 120 for a search key of 27, for example, the computer system 10 first determines that the search key is odd and begins the search at the high end of the data structure using a start index Start value of N−1. The entry corresponding to the index N−1 has a data key of 9, which does not match the search key. Accordingly, the index is decremented, i.e., incremented by a value of −1, so that the search proceeds to the entry corresponding to the index N−2. The entry corresponding to the index N−2 has a data key of 13, which also does not match the search key. The comparison process is repeated with successive entries in a "downward" direction, i.e., toward the low end of the data structure, until the entry corresponding to the index N−7 is reached. When the entry corresponding to the index N−7 is reached, the computer system 10 determines that the data key of that entry matches the search key and outputs N−7, the index of the matched entry.

The preceding example demonstrates that searching the data structure 120 starting at an end determined by whether the search key is even or odd may result in a significant improvement in search performance. By contrast, if the search started at the low end of the data structure regardless of whether the search key is even or odd, significantly more entries would have had to been processed to locate the matching entry.

As another example, to search the data structure 120 for a search key of 30, the computer system 10 determines that the search key is even and begins the search at the low end of the data structure using a start index Start value of 0. The entry corresponding to the index 0 has a data key of 2, which does not match the search key. Accordingly, the index is incremented, such that the search proceeds to the entry corresponding to the index 1. The entry corresponding to the index 1 has a data key of 10, which also does not match the search key. This comparison process is then repeated with successive entries in an "upward" direction, i.e., toward the high end of the data structure, until the End index N−1 is reached. Because, as shown in FIG. 4, no entry having a data key of 30 exists in the data structure 120, the computer system 10 outputs a value of −1 to indicate that no match was found.

Figure 5:
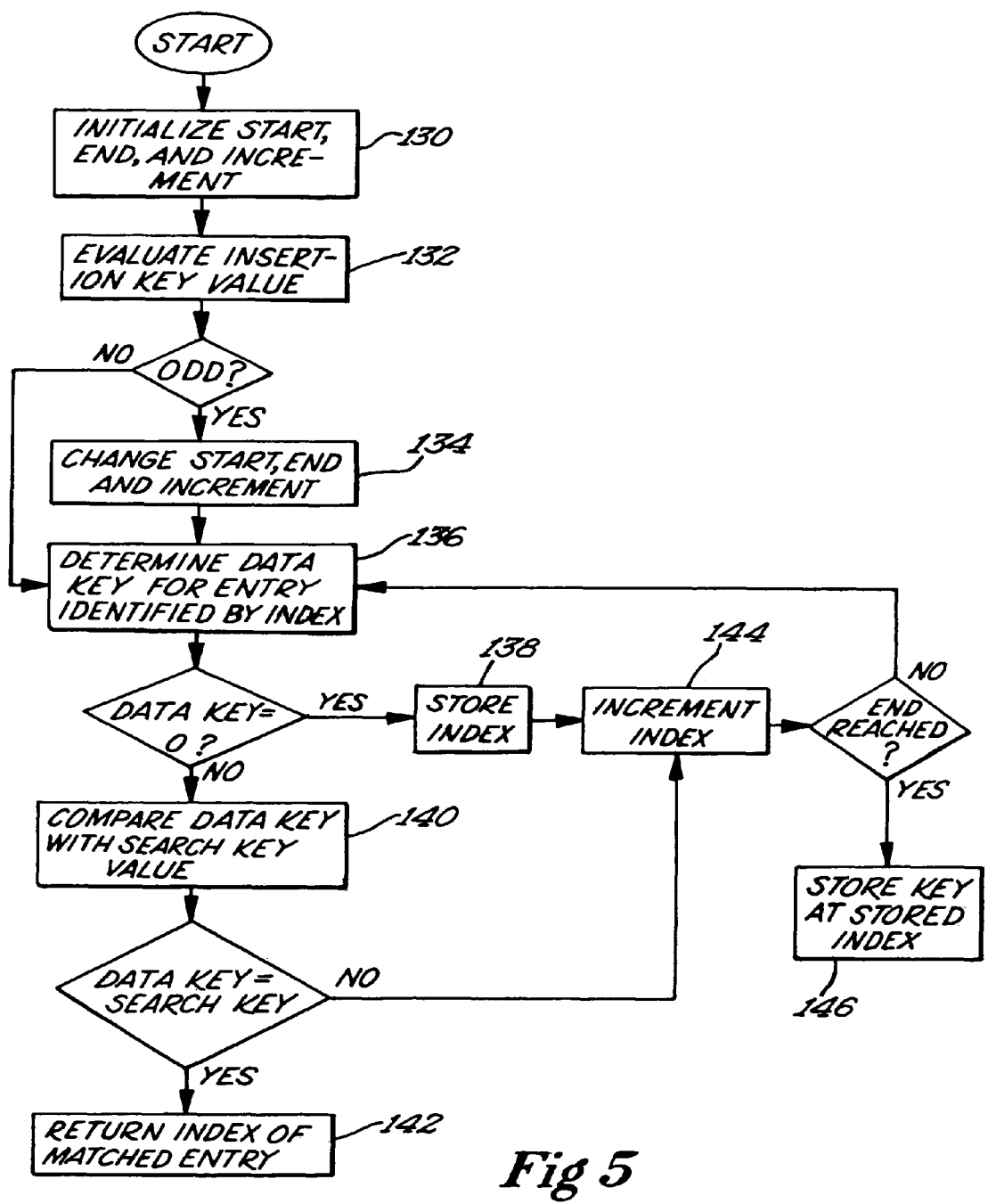
FIG. 5 is a flow diagram illustrating another example process according to still another embodiment.

FIG. 5 is a flow diagram illustrating an example method for inserting a data key, referred to as an insertion key value, into a data structure. This method employs a start index Start, an end index End, and an increment value Increment. In the example method shown in FIG. 5, the values of Start, End, and Increment are initialized (130) as if the insertion key value is even. Accordingly, Start has an initial value of 0, End has an initial value of N, and Increment has an initial value of 1.

Next, the insertion key value is evaluated (132) to determine whether it is even or odd. The insertion key value may be evaluated using any of a variety of conventional techniques, such as performing a logical AND operation with the insertion key value and a value of 1 as operands as described above in connection with FIG. 3. If the insertion key value is odd, the values of Start, End, and Increment are changed (134) so that the process starts at the last entry in the data structure and proceeds toward the first entry. Start is changed to N−1, End is changed to 0, and Increment is changed to −1.

While the method illustrated in FIG. 5 is shown as initializing the values of Start, End, and Increment as if the insertion key value is even and modifying those values if the insertion key value is odd, those of skill in the art will appreciate that alternative implementations may be practiced. As described above in connection with FIG. 3, for example, the values of Start, End, and Increment may be initialized as if the insertion key value is odd and modified if the insertion key value is even. As another alternative, the values of Start, End, and Increment may be initialized only after evaluating the insertion key value to determine whether the insertion key value is odd or even.

After assigning values for Start, End, and Increment, the computer system 10 determines a data key for the data structure entry identified by the index Start (136). If the data key for this data structure entry is 0, the entry is empty and available for storing the data key, and the computer system 10 stores the index for later use (138). If the data key for the data structure entry is non-zero, indicating that the entry is not empty and unavailable for storing the data key, the computer system 10 compares the data key with the insertion key value (140). If the data key and the insertion key are equal, the data structure already contains the insertion key value, and the computer system 10 returns the index identifying the matched entry (142).

If the data keys are not equal or if the data key of the data structure entry identified by the index Start is 0, the index is incremented by Increment (144). Incrementing the index by Increment has the effect of advancing the process to the next entry in the data structure if Increment has a value of 1. If Increment has a value of −1, incrementing the index by Increment has the effect of advancing the process to the previous entry in the data structure.

After the index is incremented, the value of the index is compared with End to determine whether the process has reached the end of the data structure. If the process has not yet reached the end of the data structure, the computer system 10 determines the data key for the data structure entry identified by the incremented index (136) and compares this key value with the insertion key value (140). If the data key and the insertion key are equal, the computer system 10 returns the index identifying the matched entry (142) to indicate that the data structure already contains the insertion key value. This process of incrementing the index (144), determining the data key for the data structure entry identified by the incremented index (136), and comparing this key value with the insertion key value (140) is repeated until a match is found. If at any point an entry is found that has a data key of 0, the computer system 10 stores the index for that entry for later use (138). If the process reaches the end of the data structure without finding an entry having a data key that matches the insertion key value, the insertion key value is inserted in the entry corresponding to the stored index (146).

Figure 6:
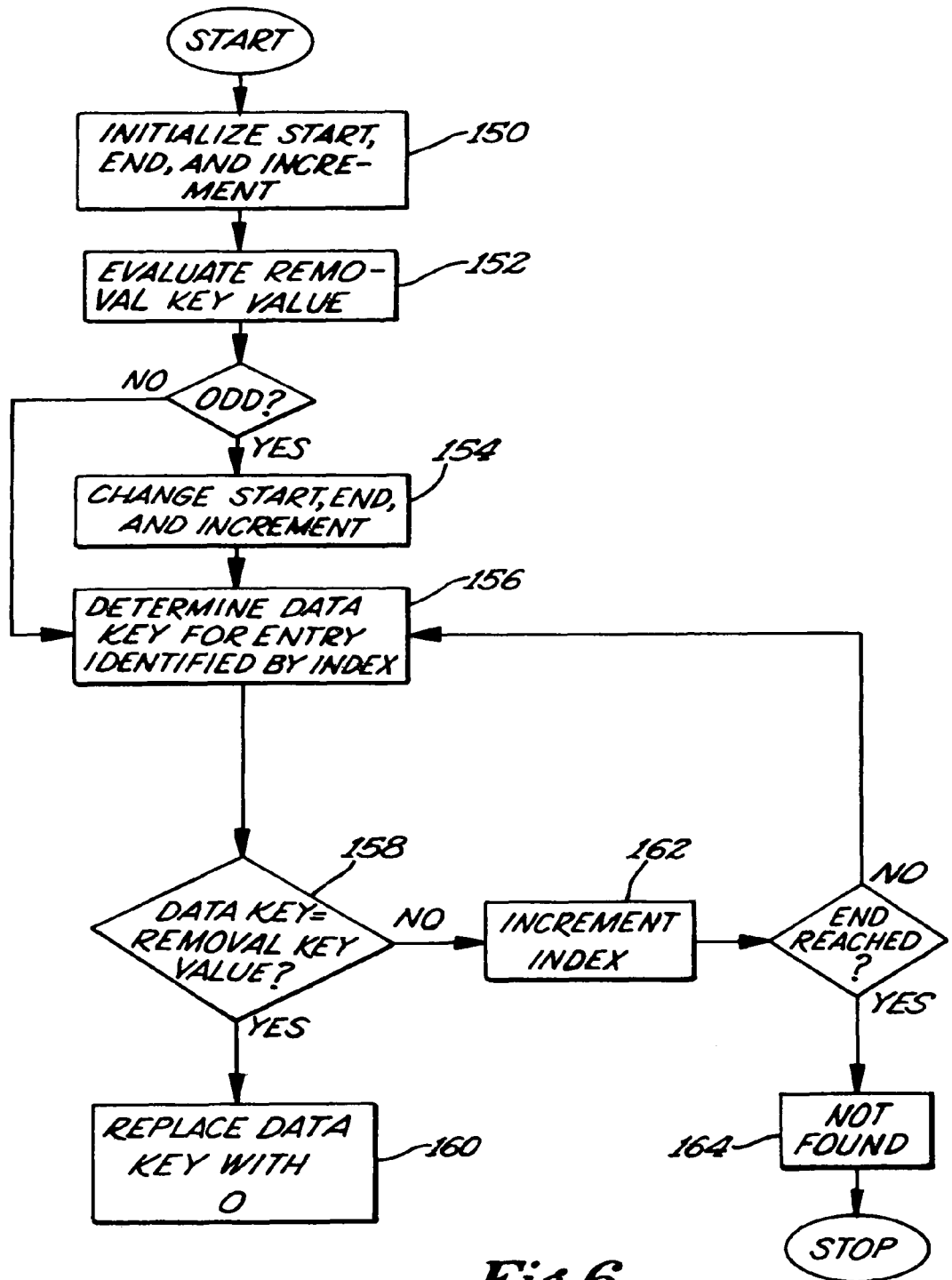
FIG. 6 is a flow diagram illustrating still another example process according to yet another embodiment.

FIG. 6 is a flow diagram illustrating an example method for removing a data key, referred to as a removal key, from a data structure. The removal method employs a start index Start, an end index End, and an increment value Increment. In the example method shown in FIG. 6, the values of Start, End, and Increment are initialized (150) as if the removal key value is even. Accordingly, Start has an initial value of 0, End has an initial value of N, and Increment has an initial value of 1.

Next, the removal key value is evaluated (152) to determine whether it is even or odd. The removal key value may be evaluated using any of a variety of conventional techniques, such as performing a logical AND operation with the search key and a value of 1 as operands as described above in connection with FIG. 3. If the removal key value is odd, the values of Start, End, and Increment are changed (154) so that the process starts at the last entry in the data structure and proceeds toward the first entry. Start is changed to N−1, End is changed to 0, and Increment is changed to −1.

As described above in connection with FIG. 3, alternative implementations may be practiced. For example, the values of Start, End, and Increment may be initialized as if the removal key value is odd and modified if the removal key value is even. In this implementation, Start has an initial value of N, End has an initial value of 0, and Increment has an initial value of −1. If the removal key value is even, Start, End, and Increment are assigned values of 0, N, and 1, respectively. As another alternative, the values of Start, End, and Increment may be initialized only after evaluating the removal key value to determine whether the removal key value is odd or even.

Regardless of the particular approach used to determine the values of Start, End, and Increment, the values control the starting point and direction of the process. The computer system 10 determines a data key for the data structure entry identified by the index Start (156) and compares this key value with the removal key value (158). If the data key and the removal key are equal, the computer system 10 replaces the data key of the data structure entry with 0 to render the data structure entry available for storing data (160). In some embodiments, entries that do not store data have a data key of 0 and are ignored; in effect, such entries are skipped.

If the data keys are not equal, the index is incremented by Increment (162). Incrementing the index by Increment has the effect of advancing the process to the next entry in the data structure if Increment has a value of 1. If Increment has a value of −1, incrementing the index by Increment has the effect of advancing the process to the previous entry in the data structure. After the index is incremented, the value of the index is compared with End to determine whether the process has reached the end of the data structure. If the process has not yet reached the end of the data structure, the computer system 10 determines the data key for the data structure entry identified by the incremented index (156) and compares this key value with the removal key value (158). If the data key and the removal key are equal, the computer system 10 replaces the data key of the data structure entry with 0 (160). This process of incrementing the index (162), determining the data key for the data structure entry identified by the incremented index (156), and comparing this key value with the removal key value (158) is repeated until a match is found. If the process reaches the end of the data structure without finding an entry having a data key that matches the removal key value, a result is returned indicating that no match was found (164). For example, the value −1 may be used to indicate that no match was found.

The methods described in this disclosure may facilitate more efficient usage of data structures. In a data structure containing N members, for example, searching a data structure from the lowest entry to the highest entry involves evaluating an average of N/2 data structure entries. By contrast, the methods described in this disclosure involve evaluating an average of N/4 data structure entries. Accordingly, on average, the number of data structure entries that are processed is reduced by approximately half.

Further, the embodiments described in this disclosure may facilitate improved utilization of the data structure. A typical data structure has substantially similar numbers of even and odd keys. Some data structures, however, may have a relatively high number of even keys or a relatively high number of odd keys. For example, if a data structure contains 80 keys, of which 50 are even and 30 are odd, the data structure would conventionally be populated with the 80 keys arranged in no particular order. In order to find either an odd or an even key, a search would involve evaluating, on average, 40 (80/2) entries. By contrast, using the techniques described in this disclosure, finding an odd key would involve evaluating, on average, 15 (30/2) entries. Finding an even key would involve evaluating, on average, 25 (50/2) entries. In either case, performance is significantly improved relative to conventional approaches in which the data structure is populated and searched from a single end in a single direction, e.g., from the low end toward the high end.

As described above, the speed with which a data key can be located or inserted in or removed from a data structure may be significantly improved. In addition, existing code can be modified easily to implement the techniques described in this disclosure. Those who practice the embodiments described herein and those skilled in the art will understand that various modifications and improvements may be made to the embodiments without departing from the spirit and scope of the disclosed embodiments. Accordingly, the scope of protection afforded is to be determined solely by the claims and by the breadth of interpretation allowed by law.

What is claimed is:

1. A method to access an entry in a data structure comprising:

storing a plurality of entries in the data structure, wherein the data structure is an array and each entry includes a data key, and a plurality of the data keys are stored in sequentially indexed entries in the array and are not ordered by values of the data keys in the sequentially indexed entries;

based on the value of a search key, selecting one of multiple possible index values to use as a preliminary index, the preliminary index being associated with a preliminary entry that is associated with a data key to which the search key will be first compared;

selecting an increment value from two or more increment values as a function of the search key;

comparing the search key with the data key associated with the preliminary entry associated with the preliminary index; and adjusting the preliminary index by the increment value when the search key and the data key associated with the preliminary entry do not match.

2. The method of claim 1, wherein selecting the preliminary index comprises selecting an index associated with a first predetermined entry or a second predetermined entry.

3. The method of claim 2, wherein the search key comprises a predetermined portion of the search key, and wherein selecting the preliminary index comprises:

selecting a first index associated with the first predetermined entry when the predetermined portion of the search key has a first value; and selecting a second index associated with the second predetermined entry when the predetermined portion of the search key has a second value.

4. The method of claim 3, wherein the predetermined portion of the search key comprises a least significant bit (LSB) of the search key.

5. The method of claim 4, further comprising:
determining a value of the LSB by performing a logical AND operation with the search key and a value of one as operands;
selecting the first index in response to determining the value of the LSB as zero; and
selecting the second index in response to determining the value of the LSB as one.

6. The method of claim 2, wherein:
the first predetermined entry is a first entry of the data structure; and
the second predetermined entry is a last entry of the data structure.

7. The method of claim 1, further comprising:
identifying an unpopulated entry of the data structure; and
when no key matching the search key is located in the data structure, storing the search key in the unpopulated entry.

8. The method of claim 1, further comprising:
when a data key matching the search key is located in the data structure, replacing the located key with a value of zero.

9. A computer system comprising:
means for storing a data structure comprising a plurality of entries, wherein the data structure is an array and each entry includes a respective data key and is associated with a respective index, and a plurality of the data keys are stored in sequentially indexed entries in the array and are not ordered by values of the data keys in the sequentially indexed entries;
means for selecting a start index from among multiple possible start index values, an end index, and an increment value from two or more increment values all as a function of a search key, an entry associated with the start index being the first entry of the data structure to process for comparison with the search key;
means for comparing the search key with the data key associated with the entry associated with the start index; and
means for adjusting the start index by the increment value when the search key and the data key associated with the entry associated with the start index do not match.

10. The computer system of claim 9, further comprising means for selecting an index associated with a first predetermined entry or a second predetermined entry of the data structure as the start index.

11. The computer system of claim 10, further comprising means for selecting the start index, the end index, and the increment value as a function of a predetermined portion of the search key.

12. The computer system of claim 10, wherein the predetermined portion of the search key comprises a least significant bit (LSB) of the search key.

13. The computer system of claim 12, further comprising:
means for determining the LSB by performing a logical AND operation with the search key and a value of one as operands; and
means for selecting an index associated with the first predetermined entry or the second predetermined entry as a function of the LSB as the start index.

14. The computer system of claim 10, further comprising:
means for identifying an unpopulated entry of the data structure; and
means for storing the search key in the unpopulated entry when no key matching the search key is located in the data structure.

15. The computer system of claim 10, further comprising means for removing a data key matching the search key from the data structure by replacing the matching key with a value of zero.

16. A computer arrangement comprising:
a memory configured to store a data structure comprising a plurality of entries, wherein the data structure is an array and each entry includes a respective data key and is associated with a respective index, and a plurality of the data keys are stored in sequentially indexed entries in the array and are not ordered by values of the data keys in the sequentially indexed entries;
a system bus operatively coupled to the memory to access the data structure; and
a processor operatively coupled to the system bus to access the data structure, the processor configured to
select a start index from multiple possible start index values, an end index, and an increment value from two or more increment values, all being selected as a function of a search key, an entry associated with the start index being the first entry of the data structure to access,
compare the search key with a data key associated with the entry associated with the start index, and
adjust the start index by the increment value when the search key and the data key associated with the entry associated with the start index do not match.

17. The computer arrangement of claim 16, wherein the processor is configured to select as the start index an index associated with a first predetermined entry or a second predetermined entry of the data structure as a function of a predetermined portion of the search key.

18. The computer arrangement of claim 17, wherein the predetermined portion of the search key comprises a least significant bit (LSB) of the search key.

19. The computer arrangement of claim 18, wherein the processor is further configured to:
determine the LSB by performing a logical AND operation with the search key and a value of one as operands; and
select as the start index an index associated with the first predetermined entry or the second predetermined entry as a function of the LSB.

20. The computer arrangement of claim 16, wherein the processor is further configured to store the search key in the data structure by:
identifying an unpopulated entry of the data structure; and
storing the search key in the unpopulated entry when no key matching the search key is located in the data structure.

21. The computer arrangement of claim 16, wherein the processor is further configured to remove a data key matching the search key from the data structure by replacing the matching key with a value of zero.

* * * * *